United States Patent Office 3,726,643
Patented Apr. 10, 1973

3,726,643
METHOD OF PRODUCING REFRACTORY CARBIDES, BORIDES, SILICIDES, SULFIDES, AND NITRIDES OF METALS OF GROUPS IV, V, AND VI OF THE PERIODIC SYSTEM
Alexandr Grigorievich Merzhanov, Valentin Mikhailovich Shkiro, and Inna Petrovna Borovinskaya, Moskovskaya, U.S.S.R., assignors to Filial Instituta Khimicheskoi Fiziki Akademii Nauk, U.S.S.R., Moskovskaya
No Drawing. Filed Apr. 9, 1970, Ser. No. 27,106
Int. Cl. C01b 21/06, 33/06, 31/30
U.S. Cl. 423—409
12 Claims

ABSTRACT OF THE DISCLOSURE

A method of producing refractory inorganic compounds such as carbides, borides, nitrides, silicides, oxides, phosphides, sulphides, fluorides and chlorides of metals of the IV, V and VI groups, in which at least one of the metals of the IV, V and VI groups of the periodic system is mixed with one of the non-metals N, C, B, Si, $O_2$, P, S, F, or $Cl_2$, and to the resulting mixture is introduced ignition means for generating a temperature sufficient for starting the process of combustion of the initial components whose further interaction takes place owing to heat generated by the reaction, the reaction of metals with metalloids C, B, Si, P, S being carried out in an inert gas medium.

---

The present invention relates to a method of producing high-melting refractory inorganic compounds such as carbides, borides, nitrides, silicides, oxides, phosphides, sulphides, fluorides and chlorides of metals of the IV, V and VI groups of the periodic system. Such compounds feature high strength, wear- and corrosion-resistance, and hardness, and find a wide application in electrical engineering, rocketry, nuclear and chemical industries.

The above compounds are used as materials for making corrosion-resistant filters, combustion boats, crucibles, parts of pumps, etc. in the chemical industry, they are used for manufacturing heat exchangers in the nuclear industry, as well as for manufacturing parts of gas-turbine plants, rockets, superconducting bolometers, etc.

There are known methods of producing such high-melting refractory inorganic compounds such as carbides, borides, nitrides, silicides, oxides, phosphides, sulphides, fluorides and chlorides of metals of the IV, V and VI groups of the periodic system, which comprise heating the initial components at a temperature of from 1,000° C. to 4,000° C. in diverse ovens in a reacting or inert gas medium. Most frequently, use is made of ovens with porcelain tubes, graphite, arc, high-frequency and resistance ovens. Used as initial components may be both pure elements and their compounds such as oxides, hydrides of metals, ammonia, hydrocarbons, boric anhydride, etc.

The product obtained as a result of thermal treatment is finely divided and subjected to a repeated thermal treatment for fuller interaction of the initial components. The latter process is carried out in several stages until the required quality of the target product is attained.

The above-described technology is almost the same for all of the above-mentioned high-melting refractory inorganic compounds, the principal difference being the temperature conditions and duration of the process. Thus, for instance, when producing nitrides from metals of the IV, V, and VI groups or their hydrides, heating is carried out in a nitrogen or ammonia flow at a temperature of from 1,200° C. to 2,000° C., the process comprises several stages since the nitration reaction is not complete due to hindered diffusion of nitrogen into a caked layer, repeated nitration being effected upon discharging and crushing the caked mass.

Carbides are synthesized by melting the initial components at a temperature of from 2,500° C. to 4,000° C. or, in the solid phase, at a temperature of 1,500–2,000° C. The process is carried out in vacuum or using as protective media hydrogen, carbon dioxide or methane. The target product obtained is finely divided and subjected to a repeated thermal treatment for fuller interaction of the initial components.

Borides and silicides are produced by interacting the initial components at a temperature of 1,900–2,000° C. in vacuum, or at a temperature of 1,300–2,050° C. in an atmosphere of argon. The process is likewise carried out in several stages until the required quality of the target product is attained.

(Cf., R. Kiffer, P. Schwarzkopf, Hard Alloys, Metallurghizdat Publishers, U.S.S.R., 1957;
J. Cadoff, S. P. Nielsen, J. Metals, 1953, 5, p. 248;
Ruffo, R. Wusch, J. anorg. algem. Chem., 1914, 85, 293.)
G. V. Samsonov, Ya.S. Umanskii, Hard Compounds of High-Melting Metals, Metallurghizdat Publishers, U.S.S.R., 1957;
E. Friederich, Z. Sitting, J. anorg. Chem., 1929, 143, 293).

The above-listed methods call for the use of special equipment and considerable consumption of energy. Besides, the known methods are disadvantageous in that they require additional stages of discharging and crushing under-reacted products which are then returned into the process for a repeated thermal treatment. When producing metal carbides by way of melting the initial components, the temperature of the process is higher than that of decomposition of the carbides or the respective metals, which brings about the presence of a considerable amount of free carbon in the end product.

It is a principal object of the present invention to improve the quality of the target product.

Another object of the invention is to simplify the process and reduce the duration thereof.

Still another object of the invention is to reduce the consumption of energy.

In the accomplishment of the principal and other objects of the present invention, in a method of producing high-melting refractory inorganic compounds by way of reacting metals of the IV, V and VI groups of the periodic system with N, C, B, Si, $O_2$, P, S, F or $Cl_2$, with a subsequent separation of the target product, according to the invention, at least one of said metals is mixed with one of said non-metals and to the resulting mixture is introduced an ignition means for generating a temperature sufficient for starting the process of combustion of the initial components, whereupon their further interaction takes place owing to heat generated by the reaction, the reaction of metals with metalloids C, B, Si, P, S being carried out in an inert gas medium.

Preferably, the initial components having a particle size of from $0.1\mu$ to $100\mu$ are used.

It is likewise expedient that the initial components used be in the form of a compressed mass having an absolute density of from 2 g./cu. cm. to 4 g./cu. cm.

The ignition of a mixture of initial components is preferably effected by means of ignition means comprising a tungsten or Nichrome electric coil through an igniting composition being essentially a mixture of the following components: $CaSi_2$, $Fe_2O_3$, Mg, $Al_2O_3$, $SiO_2$, Ti and B.

The igniting composition is obtained by preparing five mixtures of the following composition, parts by weight:

the first mixture—$CaSi_2$, 50; $Fe_2O_3$, 50
the second mixture—$CaSi_2$, 25; $Fe_2O_3$, 25; Mg, 3.15: $Al_2O_3$, 19.35; $SiO_2$, 27.5
the third mixture—Mg, 6.3; $Al_2O_3$, 38.7; $SiO_2$ 55 the fourth mixture—Mg, 6.3; $Al_2O_3$, 38.7; $SiO_2$, 55; Ti, 33.25; B, 16.75 the fifth mixture—Mg, 3.15; $Al_2O_3$, 19.35; $SiO_2$, 27.5; Ti, 66.5; B, 33.5.

The mixtures obtained are compressed one with another in succession, from the first mixture to the fifth one. For producing zirconium nitrides, the mixture is ignited directly by means of a tungsten or Nichrome electric coil. In order to increase the yield of nitrides, fluorides, chlorides and oxides of metals, the process is carried out at a pressure of an appropriate gas equal to 0.5–1,000 abs. atm.

For increasing the yield of nitrides, fluorides, chlorides and oxides of metals, the initial components are mixed with additions taken in the following amounts (percent by weight) with respect to the weight of the initial components:

respective end products or _____ 0.5–50.0
ammonium chlorides or _____ 0.5–10.0
zinc chlorides _____ 0.5–10.0

For increasing the yield of carbides, borides, silicides, phosphides and sulphides, the initial components are taken in metalloid-to-metal ratios of from 0.5:1 to 2:1.

The method proposed herein can be realized in the following manner.

Used as the initial components are metals of the IV, V and VI groups of the periodic system and non-metals N, C, B, Si, $O_2$, P, S, F and $Cl_2$. At least one of said metals is mixed with one of said non-metals, the initial components being preferably finely divided to a particle size of from $0.1\mu$ to $100\mu$. Thereupon, the resulting mixture is poured into a vessel. For ensuring a better heat transfer from the combustion zone to cool layers, the resulting mixture is compressed to an absolute density of 2 to 4 g./cu. cm., after which the mixture or compressed mass is placed in a reaction vessel provided with valves for the delivery and discharge of gas and with electric lead-ins for an ignition device. For igniting the initial mixture use can be made of diverse incandescent elements capable of generating a temperature sufficient for starting the process of combustion of the initial components, such as tungsten, molybdenum or Nichrome electric coils, wires, plates, etc.

It is expedient that the tungsten or Nichrome electric coils act upon an igniting composition being essentially a mixture of the following components: $CaSi_2$, $Fe_2O_3$, Mg, $Al_2O_3$, $SiO_2$, Ti and B.

The igniting composition is obtained by preparing five mixtures of the following composition, parts by weight:

the first mixture—$CaSi_2$, 50; $Fe_2O_3$, 50 the second mixture—$CaSi_2$, 25; $Fe_2O_3$, 25; Mg, 3.15; $Al_2O_3$, 19.35; $SiO_2$, 27.5 the third mixture—Mg, 6.3; $Al_2O_3$, 38.7; $SiO_2$, 55 the fourth mixture—Mg, 6.3; $Al_2O_3$, 38.7; $SiO_2$, 55; Ti, 33.25; B, 16.75 the fifth mixture—Mg, 3.15; $Al_2O_3$, 19.35; $SiO_2$, 27.5; Ti, 66.5; B, 33.5.

The mixtures obtained are compressed one with another in succession, from the first mixture to the fifth one.

For producing zirconium nitrides, the mixture is ignited directly with a tungsten or Nichrome electric coil.

In case the initial metalloids are C, B, Si, P or S, the process is carried out in an inert gas flow.

When so doing, a flow of inert gas is supplied to the reaction vessel or there is built up a pressure of said gas of 1 to 150 abs. atm. Thereupon, an ignition agent is introduced to the mixture of initial components placed in the reaction vessel.

Electric current is supplied to a tungsten or Nichrome electric coil and cut off immediately upon combustion of the igniting composition or, in the case of zirconium nitrides, of the mixture of initial components. Further interaction of the initial components takes place owing to heat generated by the reaction and the process spreads over the compressed mass of initial components at a rate of from 0.1 cm./sec. to 15 cm./sec. Upon the termination of the process, the target product obtained is allowed to cool for 3–5 min. and then discharged from the reaction vessel. The yield of the target product depends upon the process conditions and in a majority of cases reaches 90 to 98 percent of the theoretical maximum yield.

In order to increase the yield of nitrides, fluorides, chlorides and oxides of metals, the process is carried out at a pressure of the respective gaseous metalloid (nitrogen, fluorine, chlorine or oxygen) equal to 0.5–1,000 abs. atm., or the initial components are mixed with additions taken in the following amounts (percent by weight) with respect to the weight of the initial components:

appropriate end products or _____ 0.5–50
ammonium chlorides or _____ 0.5–10
zinc chlorides _____ 0.5–10

For increasing the yield of carbides, borides, silicides, phosphides and sulphides, the initial components are taken in metalloid-to-metal ratios of from 0.5:1 to 2:1.

For producing nitrides of metals use can be made of either gaseous or liquid nitrogen as the initial component.

When using liquid nitrogen, the process is carried out in the following manner. Powdered metal is charged into a container which is then placed in a vessel with liquid nitrogen, whereupon liquid nitrogen is poured inside the container until it ceases completely to boil away from the container. Then, the container is closed with a cover with an ignition device secured thereon, and current is supplied from a suitable source to the electric coil. The current is cut off immediately upon combustion of the igniting composition, and the process goes on owing to heat generated by the metal-nitrogen reaction. Following the termination of the process, the obtained product is discharged after being allowed to cool.

The method of producing high-melting inorganic compounds proposed herein enables the utilization of heat generated by the interaction of the initial components, helps obviate the necessity of employing diverse high-temperature ovens and simplifies the process, all without requiring a substantial consumption of energy.

The combustion process spreads over the mixture of initial components at high rates of up to 15 cm./sec., which helps considerably to reduce the duration of the whole process.

The reaction of the initial components takes place in layers, from the surface layer to sub-surface ones, which provides for fuller interaction of the reagents and obviates the necessity of repeating the process.

In accordance with the proposed method target products can be obtained as finished articles, the initial mixture being charged into pre-fabricated moulds, which renders unnecessary the use of special caking techniques employed in powder metallurgy.

For a better understanding of the present invention, the following examples of realizing the proposed method of producing high-melting inorganic compounds are presented hereinbelow by way of illustration.

EXAMPLE 1

1.74 g. (0.161 mole) of metallic powdered titanium containing 99.2 percent by weight of the base product, particle sizing ranging from $1\mu$ to $250\mu$, is mixed with 0.8 g. (0.016 mole) of boron containing 99.2 percent by weight of the base product. The mixture is compressed in a press-mould 10 mm. in dia, and 20 mm. high to an absolute density of 3 g./cu. cm. The compressed mass is placed in a reaction vessel to which is introduced an ignition agent comprising an igniting composition and a tungsten electric coil connected thereto.

The igniting composition is obtained by preparing five mixtures of the following composition, parts by weight:

the first mixture——CaSi$_2$, 50; Fe$_2$O$_3$, 50 the second mixture—CaSi$_2$, 25; Fe$_2$O$_3$, 25; Mg, 3.15; Al$_2$O$_3$, 1935; SiO$_2$, 27.5 the third mixture—Mg, 6.3; Al$_2$O$_3$, 38.7; SiO$_2$, 55 the fourth mixture—Mg, 6.3; Al$_2$O$_3$, 38.7; SiO$_2$, 55; Ti, 33.25; B, 16.75 the fifth mixture—Mg, 3.15; Al$_2$O$_3$, 19.35; SiO$_2$, 27.5; Ti, 66.5; B, 33.5.

The mixtures obtained are compressed one with another in succession, from the first mixture to the fifth one.

Prior to the commencement of the process, the reaction vessel is evacuated and then filled with argon to a pressure of one absolute atmosphere. After that, electric current is supplied from the mains to the coil. The current is cut off immediately upon combustion of the igniting composition. The combustion time of the initial mixture is two seconds. Then, the obtained product is allowed to cool in the reaction vessel for 2–3 min., after which it is discharged. The product obtained is titanium diboride in a yield of 90 percent by weight based on the titanium used.

EXAMPLE 2

Metallic powdered zirconium containing 99.6 percent by weight of the base product, particle size ranging from one to 50μ, is mixed with lampblack in equimolecular amounts. 8.8 g. of the obtained mixture is then compressed in a press-mould 15.2 mm. in dia. to an absolute density of 3.07 g./cu. cm. The process is further carried out in a manner similar to that described in Example 1. The product obtained is zirconium carbide in a yield of 98 percent by weight based on the zirconium used.

EXAMPLE 3

The initial components are similar to those of Example 2. 1.4 g. of the obtained mixture is poured into a glass container 10.2 mm. in dia. and 26 mm. high and placed in a reaction vessel. The process is further carried out in a manner similar to that described in Example 1. The product obtained is zirconium carbide in a yield of 90 percent by weight based on the zirconium used.

EXAMPLE 4

Metallic powdered titanium containing 99.4 percent by weight of the base product, particle size ranging from one to 250μ, is mixed with lampblack in equimolecular amounts. 2.3 g. of the obtained mixture is compressed in a press-mould 10 mm. in dia. and 12 mm. high to an absolute density of 2.25 g./cu. cm. The process is further carried out in a manner similar to that described in Example 1. The product obtained is titanium carbide in a yield of 89 percent by weight based on the titanium used.

EXAMPLE 5

Metallic powdered hafnium containing 99.7 percent by weight of the base product is mixed with lampblack in equimolecular amounts. 8.5 g. of the obtained mixture is compressed in a press-mould 10 mm. in dia. and 12 mm. high to an absolute density of 5.7 g./cu. cm. The process is further carried out in a manner similar to that described in Example 1. The product obtained is hafnium carbide in a yield of 98 percent based on the hafnium used.

EXAMPLE 6

Metallic powdered zirconium containing 99.6 percent by weight of the base product, particle size ranging from one to 50μ, is mixed in equimolecular amounts with silicon powder containing 99.9 percent by weight of the base product. 5.4 g. of the obtained mixture is compressed in a press-mould 10 mm. in dia. and 12 mm. high to an absolute density of 3.0 g./cu. cm. The process is further carried out in a manner similar to that described in Example 1.

The product obtained is zirconium silicide in a yield of 98 percent by weight based on the zirconium used.

EXAMPLE 7

Metallic powdered zirconium containing 99.6 percent by weight of the base product is mixed in equimolecular amounts with amorphous boron containing 99.2 percent by weight of the base product. 5.4 g. of the obtained mixture is compressed in a press-mould 10 mm. in dia. and 12 mm. high to an absolute density of 3.6 g./cu. cm. The process is further carried out in a manner similar to that described in Example 1.

The product obtained is zirconium boride in a yield of 90 percent by weight based on the zirconium used.

EXAMPLE 8

Five grams of metallic powdered zirconium containing 99.6 percent by weight of the base product is compressed in a press-mould 10 mm. in dia. and 12 mm. high to an absolute density of 2.2 g./cu. cm. To the obtained compressed mass placed in a reaction vessel is introduced an ignition agent in the form of a tungsten electric coil so that the coil is 2–3 mm. removed from the mass, and not further. Prior to the commencement of the process the reaction vessel is evacuated and then filled with highly-pure nitrogen (oxygen content not exceeding 0.003 percent by volume) to a pressure of one absolute atmosphere. After that, electric current is supplied from the mains to the electric coil. The current is cut off immediately upon combustion of the mass. The combution time of the initial components is two seconds. Then, the obtained product is allowed to cool for two minutes, after which it is discharged. The product obtained is zirconium nitride in a yield of 70 perecnt based on the zirconium used.

EXAMPLE 9

Ten grams of powdered zirconium containing 99.6 percent by weight of the base product, particle size ranging from one to 50μ, is poured into a steel container and placed in a reaction vessel. The process is further carried out in a manner similar to that described in Example 8. The product obtained is zirconium nitride in a yield of 50 percent by weight based on the zirconium used. According to the data of chemical and X-ray phase analyses, the obtained product is essentially ZrN, with lattice parameters $a=4.567\pm0.003$ kz.

EXAMPLE 10

4.2 g. of powdered zirconium containing 99.6 percent by weight of the base product, particle size ranging from one to 50μ, is compressed in a press-mould 10 mm. in dia. and 12 mm. high to an absolute density of 2.2 g./cu. cm. The process is carried out in a manner similar to that described in Example 8. In the course of combustion, nitrogen is blown through the reaction vessel. The product obtained is zirconium nitride in a yield of 65 percent by weight based on the zirconium used.

EXAMPLE 11

Five grams of metallic powdered zirconium containing 99.6 percent by weight of the base product, particle size ranging from one to 50μ, is compressed in a press-mould 10 mm. in dia. and 12 mm. high to an absolute density of 4.1 g./cu. cm.

The process is further carried out in a manner similar to that described in Example 8. When so doing, the nitrogen pressure in the reaction vessel is equal to 1,000 abs. atm. The product obtained is zirconium nitride in a yield of 98 percent by weight based on the zirconium used. According to the data yielded by the chemical and X-ray phase analyses, the obtained product is essentially $$ZrN_{06}\text{-}ZrN_{0.75}$$

with lattice parameters $a=4.61\pm0.005$ kz.

EXAMPLE 12

2.8 g. of metallic powdered titanium containing 99.4 percent by weight of the base product, particle size ranging from one to 250µ, is compressed in a press-mould 10 mm. in dia. and 12 mm. high to an absolute density of 2.5 g./cu. cm. The resulting compressed mass is placed in a reacting vessel. The process is carried out in a manner similar to that described in Example 1. Prior to the commencement of the process the reaction vessel is evacuated and then filled with nitrogen to a pressure of one absolute atmosphere.

The product obtained is titanium nitride in a yield of 30 percent by weight based on the titanium used.

EXAMPLE 13

Five grams of metallic powdered columbium containing 99.5 percent of the base product, particle size ranging from one to 50µ, is compressed in a press-mould 10 mm. in dia. and 12 mm. high to an absolute density of 4.3 g./cu. cm. The process is further carried out in a manner similar to that described in Example 1. Prior to the commencement of the process the reaction vessel is evacuated and then filled with nitrogen to a pressure of one absolute atmosphere. The product obtained is niobium nitride in a yield of 90 percent by weight based on the columbium used.

EXAMPLE 14

Five grams of metallic powdered zirconium is mixed with five grams of zirconium nitride. The process is further carried out in a manner similar to that described in Example 1. When so doing, the reaction vessel is evacuated and then filled with highly-pure nitrogen to a pressure of 10 abs. atm.

The product obtained is zirconium nitride in a yield of 93 percent by weight based on the zirconium used.

EXAMPLE 15

4.12 g. of metallic powdered zirconium containing 99.6 percent of the base product, particle size ranging from one to 50µ, is mixed with 0.08 g. of ammonium chloride. The process is carried out in a manner similar to that described in Example 1. When so doing, the reaction vessel is evacuated and then filled with highly-pure nitrogen to a pressure of one absolute atmosphere. The end product obtained is roasted at 200° C. for two hours to remove the traces of ammonium chloride. The obtained product following roasting is zirconium nitride in a yield of 80 percent by weight based on the zirconium used.

EXAMPLE 16

Five grams of metallic powdered molybdenum containing 99.6 percent by weight of the base product is mixed with 3.3 g. (0.104 mole) of sulphur powder. The mixture is compressed in a press-mould 10 mm. in dia. and 13 mm. high. The process is carried out in a manner similar to that described in Example 1. When so doing, the pressure of argon in the reaction vessel is 50 abs. atm. The product obtained is molybdenum disulphide in a yield of 99 percent based on the molybdenum used.

EXAMPLE 17

Five grams of metallic powdered columbium containing 99.6 percent by weight of the base product is mixed with 1.5 g. (0.016 mole) of metallic powdered zirconium containing 99.5 percent by weight of the base product. The resulting mixture is compressed in a press-mould 10 mm. in dia. and 12 mm. high. The process is further carried out in a manner similar to that described in Example 1.

When so doing, the reaction vessel is evacuated and then filled with nitrogen to a pressure of 10 abs. atm. The product obtained is double nitride of columbium and zirconium in a yield of 95 percent by weight based on the mixture of metals used.

EXAMPLE 18

Ten grams of metallic powdered columbium containing 99.6 percent of the base product is compressed in a press-mould 15 mm. in dia. and 12 mm. high. The process is carried out in a manner similar to that described in Example 1, the reaction vessel being filled with air to a pressure of 10 abs. atm. The product obtained is columbium pentoxide in a yield of 90 percent by weight based on the columbium used.

EXAMPLE 19

Twenty grams of metallic powdered zirconium containing 99.5 percent by weight of the base product is poured into a cylindrical vessel made of steel and placed in a cooling bath with liquid nitrogen. Liquid nitrogen is poured inside the vessel until it ceases completely to boil away. There upon, the zirconium-liquid nitrogen mixture is ignited in a manner similar to that deescribed in Example 1.

The product obtained is zirconium nitride in a yield of 83 percent by weight based on the zirconium used.

We claim:

1. A method of producing refractory inorganic carbides, borides, silicides, sulfides and nitrides of metals which comprises mixing at least one metal selected from Groups IV, V and VI of the periodic system with one non-metal selected from the group consisting of C, B, Si, S and liquid nitrogen, and heating the surface of the resulting mixture by a heat source selected from the group consisting of a tungsten electric coil, a Nichrome electric coil, a combination of a tungsten or a Nichrome electric coil with an igniting composition, and thermal radiation to produce over a small area of the surface of said mixture a local temperature adequate for initiating a combustion process in a thin layer of starting components, said combustion process propagating from one mixture layer to another due to the heat evolved by reacting starting components and heat transfer, the combustion of said starting components being carried out in an inert gas medium.

2. The method as set forth in claim 1, wherein the metals selected from Groups IV, V and VI of the periodic system have a particle size of from $0.1\mu$ to $100\mu$.

3. The method as set forth in claim 1, wherein the metals selected from Groups IV, V and VI of the periodic system are compressed with non-metals selected from the group consisting of C, B, Si and S to attain a density of from 2 g./cu. cm. to 4 g./cu. cm.

4. The method as set forth in claim 1, wherein the yields of carbides, borides, silicides and sulfides are improved by employing a molar ratio of starting non-metals to metals in the range of from 0.5:1 to 2:1.

5. The method as set forth in claim 1, wherein the mixture of starting components is ignited by a tungsten or Nichrome electric coil in combination with an igniting composition comprising a mixture of $CaSi_2$, $Fe_2O_3$, Mg, $Al_2O_3$, $SiO_2$, Ti, and B.

6. The method as set forth in claim 5, wherein the igniting composition is prepared by mixing 50 parts by weight of $CaSi_2$ and 50 parts by weight of $Fe_2O_3$, compressing the resulting mixture in a mould; pressing onto the first mixture thus obtained a second mixture comprising 25 parts by weight of $CaSi_2$, 25 parts by weight of $Fe_2O_3$, 3.15 parts by weight of Mg, 19.35 parts by weight of $Al_2O_3$, and 27.5 parts by weight of $SiO_2$; pressing onto said second mixture a third mixture comprising 6.3 parts by weight of Mg, 38.7 parts by weight of $Al_2O_3$, and 55 parts by weight of $SiO_2$; pressing onto said third mixture a fourth mixture comprising 6.3 parts by weight of Mg, 38.7 parts by weight of $Al_2O_3$, 55 parts by weight of $SiO_2$, 33.25 parts by weight of Ti, and 16.75 parts by weight of B, pressing onto said fourth mixture a fifth mixture comprising 3.15 parts by weight of Mg, 19.35 parts by weight of $Al_2O_3$, 27.5 parts by weight of $SiO_2$, 66.5 parts by weight of Ti, and 33.5 parts by weight of B, and thereafter affixing to the igniting composition thus obtained an electric coil so as to provide a contact between said coil and said first mixture.

7. A method of producing refractory inorganic nitrides of metals which comprises placing at least one metal selected from Groups IV, V and VI of the periodic system in a gaseous nitrogen medium and heating the surface of said metal by a heat source selected from the group consisting of a tungsten electric coil, a Nichrome electric coil, a combination of a tungsten or a Nichrome electric coil with an igniting composition and thermal radiation to produce over a small area of the surface of said metal a local temperature adequate for initiating a combustion process in a thin layer of said metal, said combustion process propagating from one metal layer to another due to the heat evolved in the course of the reaction between said metal and gaseous nitrogen and heat transfer.

8. The method as set forth in claim 7, wherein the metals selected from Groups IV, V and VI of the periodic system are compressed to attain a density of from 2 g./cu. cm. to 4 g./cu. cm.

9. The method as set forth in claim 7, wherein the process is carried out under a nitrogen gas pressure of from 0.5 to 1,000 abs. atm. in order to obtain metal nitrides of diverse composition in the homogeneity region.

10. The method as set forth in claim 7, wherein the yield of stoichiometric nitrides is enhanced by mixing the starting metals with additives selected from the group consisting of nitrides of the starting metals, ammonium chloride and zinc chloride, said additives being employed in the following amounts, percent by weight of the starting metals:

metal nitride _____ 0.5–50
ammonium chloride _____ 0.5–10
zinc chloride _____ 0.5–10

11. The method as set forth in claim 7, wherein the mixture is ignited with a tungsten or Nichrome electric coil in combination with an igniting composition comprising a mixture of $CaSi_2$, $Fe_2O_3$, Mg, $Al_2O_3$, $SiO_2$, Ti, and B.

12. The method as set forth in claim 11, wherein the igniting composition is prepared by mixing 50 parts by weight of $CaSi_2$ and 50 parts by weight of $Fe_2O_3$, compressing the resulting mixture in a mould; pressing onto the first mixture thus obtained a second mixture comprising 25 parts by weight of $CaSi_2$, 25 parts by weight of $Fe_2O_3$, 3.15 parts by weight of Mg, 19.35 parts by weight of $Al_2O_3$, and 27.5 parts by weight of $SiO_2$; pressing onto said second mixture a third mixture comprising 6.3 parts by weight of Mg, 38.7 parts by weight of $Al_2O_3$, and 55 parts by weight of $SiO_2$; pressing onto said third mixture a fourth mixture comprising 6.3 parts by weight of Mg, 38.7 parts by weight of $Al_2O_3$, 55 parts by weight of $SiO_2$, 33.25 parts by weight of Ti, and 16.75 parts by weight of B; pressing onto said fourth mixture a fifth mixture comprising 3.15 parts by weight of Mg, 19.35 parts by weight of $Al_2O_3$, 27.5 parts by weight of $SiO_2$, 66.5 parts by weight of Ti, and 33.5 parts by weight of B, and thereafter affixing to the igniting composition thus obtained an electric coil so as to provide a contact between said coil and said first mixture.

References Cited
UNITED STATES PATENTS 3,056,658 10/1962 Brennan et al. ____ 23—204 R

FOREIGN PATENTS 1,010,651 11/1965 Great Britain _____ 23—191

EDWARD J. MEROS, Primary Examiner

H. S. MILLER, Assistant Examiner

U.S. Cl. X.R.

423—289, 344, 561, 439